Patented June 12, 1945

2,378,235

UNITED STATES PATENT OFFICE 2,378,235

PROCESS FOR GROUND FIXATION

Thomas Kirk Miles, Orinda, Calif., assignor to Shell Development Company, San Francisco, Calif., a corporation of Delaware No Drawing. Application September 15, 1942, Serial No. 458,469

13 Claims. (Cl. 61—38)

This invention relates to a method for ground fixation and impermeabilization toward water by injection of an asphalt emulsion which breaks after the emulsion is in place. Specifically, it relates to a novel method for effecting this break at the right moment with the aid of certain types of coagulants.

It is known to inject asphalt emulsions into loose soils or sub-soils such as sands either to stabilize or impermeabilize them or both. In order to make such treatment effective, it is usually necessary that the emulsions be able to travel a distance of at least several feet through the soil formation and thereafter "break." When the break occurs, the average particle size in the emulsion is increased so that the emulsion becomes entrapped, thereby producing a formation which is more or less impermeable for water.

Asphalt emulsions to be suitable for this process are difficult to produce, because, on the one hand, initially the asphalt particles must be exceedingly finely dispersed, i. e., their average particle size should not exceed 2–3 microns, and the maximum size should not be above about 6 microns, so as to enable their passing through the formation; and, on the other hand, the emulsion must possess a "balanced" stability which is great enough to allow pumping of the emulsion into and through the formation without breaking, and, at the same time, is low enough so that the required break occurs when the emulsion has reached its destination. A reasonably quick break after pumping is especially important where underground water must be combatted, which water washes away the emulsion if given enough time. A favorite method for timing the break comprises incorporating sodium aluminate and certain esters, such as ethyl or methyl formate into the water phase of the asphalt emulsion in which the emulsifying agent is a water-soluble soap, such as sodium oleate, naphthenate, etc. The ester gradually hydrolyzes and liberates formic acid which then brings about the break.

It is known that in general suitable asphalt emulsions must contain not only an emulsifier such as an alkali metal fatty acid soap, but, in addition, a stabilizer such as casein. Unless the latter is present, the emulsions upon being filtered through relatively thin layers of soil, will break immediately. This would prevent in most instances the desired depth of penetration of soils by the emulsion.

However, the stabilizers have the disadvantage of preventing a complete break with the timing agent or coagulants heretofore employed, the break amounting merely to an agglomeration of several asphalt particles to larger clusters without causing the formation of a continuous asphalt film. In other words, after the break the emulsion still remains emulsified, although the broken emulsion is much coarser than the original, and the break is what may be called a "soft break." It would be highly desirable to produce a "hard break," i. e., to accomplish a more or less complete separation between the asphalt and water and to make a continuous asphalt film, because only then is it possible that the asphalt can attach itself to the soil particles and assert its maximum stabilizing and impermeabilizing effect.

It is a purpose of this invention to produce asphalt emulsions which are very fine and stable enough to penetrate through ordinary loose soil formations such as, for example, water sands, and which emulsions break after a certain length of time. It is another purpose to provide such emulsions in which the break is far more complete than has been possible heretofore, thus greatly improving the stability and the resistance to erosion of the impermeabilized sand mass.

It has been found that asphalt-in-water emulsions which are capable of deeply penetrating through soil formations and possessing the desired temporary stability can be produced by emulsifying water and asphalt with a soap-type emulsifier and, if desired, stabilizer such as casein, which asphalt contains dissolved a small amount of an oil-soluble cation surface-active compound as a coagulant.

Surface-active compounds are in general electrolytes identifiable by their property of greatly diminishing the surface tension of pure water when added thereto in small amounts, e. g., in amounts of few tenths of 1%. In cation surface-active compounds, it is the cation which is active in effecting this reduction in surface tension, although the anion may, if desired, also be surface-active.

Cation-active compounds useful in this invention are oil-soluble relatively strong organic bases, and preferably their salts. These compounds should have molecular weights of at least about 300, and preferably in excess of 350 or 400. Oil-solubility imposes certain upper limits on the molecular weights, which upper limits, however, may vary between extremely wide limits, depending on the type of compounds used.

Suitable quantities of the coagulant range in general from about .5% to 10% and usually about 1% to 5%, the exact quantities varying with the type of emulsion.

The coagulants employed in accordance with this invention have several advantages over those employed in the past. In the first place, since they are asphalt-soluble, they can be incorporated in the asphalt long prior to emulsifying the latter. This is of some importance, because the emulsions must be prepared at or near the location of their use on account of the temporary nature of their stability. Anything which will simplify field operation is advantageous, because frequently in temporary set-ups as would be used in the field, control is difficult to obtain, and control of the time of stability of the emulsion used for ground surface is important.

Another advantage, particularly characteristic of the salts described before, is that they produce a hard break which may be so complete as to result in the formation of a continuous asphalt film.

Still another advantage resides in the fact that the effectiveness of the coagulants of this invention is in general little influenced, if at all, by the presence of casein and other stabilizers.

Cation-active compounds which can be used alone if their molecular weights are sufficiently high, or in the form of their salts, of sufficient molecular weight for the purpose of this invention include, for example, most quaternary ammonium bases, and primary, secondary and tertiary amines, all of which may be aliphatic, alicyclic, aromatic or mixed, and which should contain at least one aliphatic saturated hydrocarbon radical of at least 12 carbon atoms, and further may contain polar substitution radicals such as chlorine, hydroxyl, ether, esters, sulfide, hydrosulfide, sulfo, etc.; analogous sulfur, phosphorus, arsenic, antimony, etc., compounds. Examples of such compounds are paraffin wax amine (produced by chlorination of paraffin wax and subjecting the chlorinated product to ammonolysis), mono alkyl- amines, such as lauryl, miristyl, cetyl, stearyl, chlorcetyl amine, etc., primary amines; secondary amines such as methyl cetyl, ethyl stearyl, lauryl stearyl amines; tertiary amines, such as dimethyl lauryl, dimethyl cetyl, methyl ethyl stearyl, tri- stearyl, etc., amines; quaternary bases as trimethyl cetyl ammonium, lauryl pyridinium, dimethyl phenyl stearyl ammonium, dimethyl benzyl cetyl ammonium, etc.; fatty acid ester of ethanolamine wherein the fatty acid may be lauric, palmitic, stearic, etc., acid; and others.

Salts of these bases are in general considerably more effective than the free bases. While salts with inorganic acids such as the sulfates, chlorides, fluorides, phosphates, etc., are often useful, salts with organic acids, particularly those of relatively high molecular weights, are usually more effective. Suitable organic acids may comprise fatty acids, including the lower members, e. g., acetic, propionic, butyric acids, preferably, however, the higher fatty acids having 10 or more carbon atoms, e. g., lauric, myristic, palmitic, stearic, arachic, oleic, etc., acids; aromatic carboxylic acids, such as benzoic, toluic, naphthoic, salicylic; dicarboxylic acids as succinic, sebacic, phthalic, etc., acids and alkyl derivatives thereof; sulfonic, such as phenyl sulfonic, naphthyl sulfonic, alkyl phenyl sulfonic, petroleum sulfonic, etc., acids; alkyl sulfuric, such as lauryl sulfuric, cetyl sulfuric, stearyl sulfuric, etc., acids.

Amides that may form, for example, between primary amines and carboxylic acids are in general ineffective in bringing about a break of the emulsion, and in dissolving amines and carboxylic acids in the asphalt, care should be taken to avoid the formation of acid amides.

Soaps as herein defined which are suitable as emulsifiers are the alkali metal salts, (usually Na or K) of fatty acids, naphthenic acids, asphaltic acids, rosin acids, wool fat acids, acids produced by oxidation of paraffin wax, oil-soluble sulfonic acids, such as oil-soluble petroleum sulfonic acids, etc. If desired, they may contain small amounts of free alkali. Stabilizers other than casein are, for example, blood albumen, gelatin, etc. The stabilizer may be protected against putrefaction by the addition of some formaldehyde.

Soap and stabilizer contents in the emulsion normally vary between .5%–2% and .5%–5%, respectively, by weight of the aqueous phase.

The amounts of the time-controlling coagulant incorporated into the asphalt vary between fairly wide limits, depending primarily on the following factors: (1) The length of time required to effect the break—the shorter the time required, the higher must be the concentration; (2) the viscosity of the asphalt at the average temperature of the emulsion when in use, relatively high viscosities calling for larger quantities of the same coagulant and for the breaking time than lower viscosities; (3) the relative proportions of the disperse (asphalt) phase and continuous (water) phase in the emulsion; (4) the nature of the coagulant itself, including its molecular weight; and (5) size of the asphalt particles in the emulsion, fine emulsions normally breaking more quickly than coarser ones.

In view of the many factors which influence the relation of breaking time to amount of coagulant, it is impossible to calculate the exact amount required to result in a definite breaking time. Instead, it is easier and more accurate to determine experimentally in advance the amount required with a given asphalt under the emulsifying conditions to be employed in the field.

Methods of emulsification are conventional. The asphalt is heated to above its melting point, and the coagulant is dissolved in the proper amount. An aqueous soap solution may be separately heated, and the two solutions are then combined in a colloid mill or other suitable emulsifying mill, or else the soap forming acid may be added to the asphalt in addition to the coagulant and the asphalt is then emulsified with an aqueous solution of sodium or potassium hydroxide. A preferred method of mixing comprises dividing the water required for the emulsification into two portions, emulsifying the asphalt first with one portion only so as to produce a concentrated emulsion containing about 20%–30% water and then diluting this emulsion with the remainder of the water to the desired asphalt content, which normally ranges between about 25%–60%. The amount of soap or caustic required may, if desired, all be introduced with the first portion of the water, or else may be "split" together with the water.

By using the split emulsification, a finer emulsion can be obtained than by the one step method, a fine emulsion normally being an essential requirement to allow free travel of an emulsion through a soil formation without resulting in premature plugging.

The action of the coagulant takes place by diffusion into the asphalt-water interface. When the emulsion is freshly made, the coagulant is evenly distributed through the asphalt particle. However, immediately thereafter a migration begins towards the periphery of the particle, because, on account of the polar nature of the coagulant, it has a tendency to concentrate at the asphalt-water interface. When reaching this interface, the coagulant begins to counteract the emulsifier by exerting an opposite force which tends to reverse the electrical charges at the interface, and when a sufficient quantity of the coagulant has reached this area, the emulsion will break.

The following examples further illustrate my invention:

Several emulsions were prepared with a liquid asphalt having a Saybolt furol viscosity at 210° F. of about 350 seconds and containing different coagulating agents in different amounts. The procedure followed was to emulsify 6 parts of the asphalt with about 2-3 parts of the soap solution in a colloidal mill. The resulting emulsion concentrate was then diluted either with water or casein solution, and the final emulsion was then allowed to stand for observation. Results are summarized in the tables below:

2. The emulsion of claim 1 wherein the amount of soap is between .5%-2% by weight of the water content.

3. The emulsion of claim 1 wherein said oil-soluble compound is a cation surface-active organic acid salt of an organic base.

4. The emulsion of claim 1 wherein said oil soluble compound is a fatty acid salt of an aliphatic amine, said fatty acid having at least 10 carbon atoms.

5. The emulsion of claim 1 wherein said oil soluble compound is a paraffin wax amine salt.

6. The emulsion of claim 1 wherein said oil soluble compound is paraffin wax amine hydrochloride.

7. The emulsion of claim 1 wherein said oil soluble compound is paraffin wax amine stearate.

8. The emulsion of claim 1 wherein said oil soluble compound is a $C_{16-18}$ aliphatic amine stearate.

9. The emulsion of claim 1 wherein the maximum asphalt particle size is not greater than 6 microns.

*Table I*

| Asphalt content of emulsion | 60% | 60% | 60% | 30% | 60% |
|---|---|---|---|---|---|
| Emulsifier | Rosin Soap | Rosin soap | Naphthenic acid soap | Naphthenic acid soap | Rosin soap. |
| Casein (in percent of asphalt) | None | None | None | None | None. |
| Coagulant: kind and amount (in percent of asphalt) | 1% wax amine [1] | 1% wax amine [1] +1% stearic acid. | 1% wax amine [1] +1% stearic acid. | 1% wax amine [1] +1% stearic acid. | 2% wax amine [1] hydrochloride. |
| Behavior on standing | Thickened in 13 days, broke almost completely in 1 month. | Standing overnight, emulsion had become coherent mass. | Standing overnight, emulsion had broken completely. | Standing overnight, did not break but had agglomerated sufficiently so it would not filter through Wilmington sand.[2] | Thickened in 24 hours, still pourable. In 48 hours half of sample was like cream cheese. In 144 hours had broken completely. |

[1] Paraffin wax amine, molecular weight about 500.
[2] Sand obtained from Wilmington (California) harbor. The sand had a void content of 43.1% and the following sieve analysis:
Sieve 40 —————— 91.2% passing
Sieve 50 —————— 76.2% passing
Sieve 100 ————— 21.8% passing
Sieve 200 ————— 2.2% passing

*Table II*

| Asphalt content of emulsion | 60% | 60% | 60% |
|---|---|---|---|
| Emulsifier | Rosin soap | Rosin soap | Rosin soap. |
| Casein in percent of asphalt | 2% | 2% | 2%. |
| Coagulant: kind, amount in percent of asphalt | 2% wax amine [1] +½% stearic acid. | 2% wax amine [1] +¾ stearic acid. | 2% wax amine [1] +1½% stearic acid. |
| Behavior on standing | Thickened in 14 days | Broken completely in 16 hours. | Broken completely in 16 hours. |

[1] Paraffin wax amine, molecular weight about 500.

*Table III*

| Asphalt content of emulsion | 60% | 60% | 60% | 60% |
|---|---|---|---|---|
| Emulsifier | Rosin soap | Rosin soap | Rosin soap | Rosin soap. |
| Casein in percent of asphalt | None | None | None | None. |
| Coagulant: kind, amount in percent of asphalt | 2% $C_{16-18}$ mixed n-aliphatic amines. | 2% $C_{16-18}$ mixed n-aliphatic amines acetate. | 2% $C_{16-18}$ mixed n-aliphatic amines stearate. | 4% $C_{16-18}$ mixed n-aliphatic amines stearate. |
| Behavior on standing | No break | No break | Thickened in 16 hours. | Thickened in 16 hours, more so than in preceding test. |

I claim as my invention:

1. A fine asphalt-in-water emulsion of temporary stability in which the emulsifier is an alkali metal soap and the asphalt contains dissolved from .5%-10% by weight of an oil-soluble compound having a molecular weight in excess of 300 selected from the group consisting of cation surface-active organic bases and their salts.

10. A fine asphalt-in-water emulsion of temporary stability emulsified with an alkali metal soap and containing a protein stabilizer, the asphalt in said emulsion containing dissolved from .5%-10% by weight of an oil-soluble compound having a molecular weight in excess of 300 selected from the group consisting of cation surface-active organic bases and their salts.

11. The emulsion of claim 10 wherein the stabilizer is casein.

12. Process for the fixation of soils comprising injecting into said soil a fine asphalt-in-water emulsion in which the emulsifier is an alkali metal soap, said asphalt containing dissolved an oil-soluble compound having a molecular weight in excess of 300 selected from the group consisting of cation surface-active organic bases and their salts, the amount of said oil-soluble compound being between about .5% and 10% by weight of said asphalt and sufficient to cause coagulation of said emulsion within a desired time after completed injection.

13. The process of claim 12 wherein the amount of said oil-soluble compound is between 1% and 5% by weight of said asphalt.

THOMAS KIRK MILES.